United States Patent [19]

Halstead et al.

[11] 3,996,518
[45] Dec. 7, 1976

[54] INDUCTIVE CARRIER COMMUNICATION SYSTEMS

[75] Inventors: William S. Halstead, Woodland Hills; Richard W. Burden, Canoga Park, both of Calif.

[73] Assignee: Carrier Communication, Inc., New York, N.Y.

[22] Filed: Oct. 31, 1974

[21] Appl. No.: 519,763

[52] U.S. Cl. .................................. 325/54; 179/82; 343/200
[51] Int. Cl.² ......................................... H04H 1/04
[58] Field of Search ...................... 325/51, 53, 54; 179/1 DD, 82; 343/200

[56] References Cited

UNITED STATES PATENTS

| | | | |
|---|---|---|---|
| 2,567,431 | 9/1951 | Halstead | 179/82 |
| 3,023,308 | 2/1962 | Herzfeld | 325/54 |
| 3,162,726 | 12/1964 | Rosenberg et al. | 179/1 DD |
| 3,609,247 | 9/1971 | Halstead | 179/82 |
| 3,766,476 | 10/1973 | Silitch | 179/82 X |

*Primary Examiner*—Benedict V. Safourek
*Attorney, Agent, or Firm*—Steven H. Bazerman

[57] ABSTRACT

A communication system for the transmission of the sound portion of motion pictures or the like in drive-in theaters directly to automobile radios by means of an induction cable buried beneath the ground in the reception area in which automobiles viewing the motion picture are to be parked. The cable is of such design that when properly positioned and combined with an amplitude-modulated radio frequency signaling means, a relatively uniform amplitude-modulated electromatic field of the desired strength and of a frequency which is within the normal reception range of car radios (i.e. the standard broadcast band) is established throughout only the area where the automobiles are parked.

To limit signal reception outside the designated parking area of a drive-in theater an interfering signal is transmitted by coupling audio-modulated radio-frequency energy to nearby electric power lines of overhead type or by means of a transmission line or cable adjacent and outside the theater area. The interfering signal employs the same radio frequency as is used by the induction cable in the reception area of the theater.

10 Claims, 16 Drawing Figures

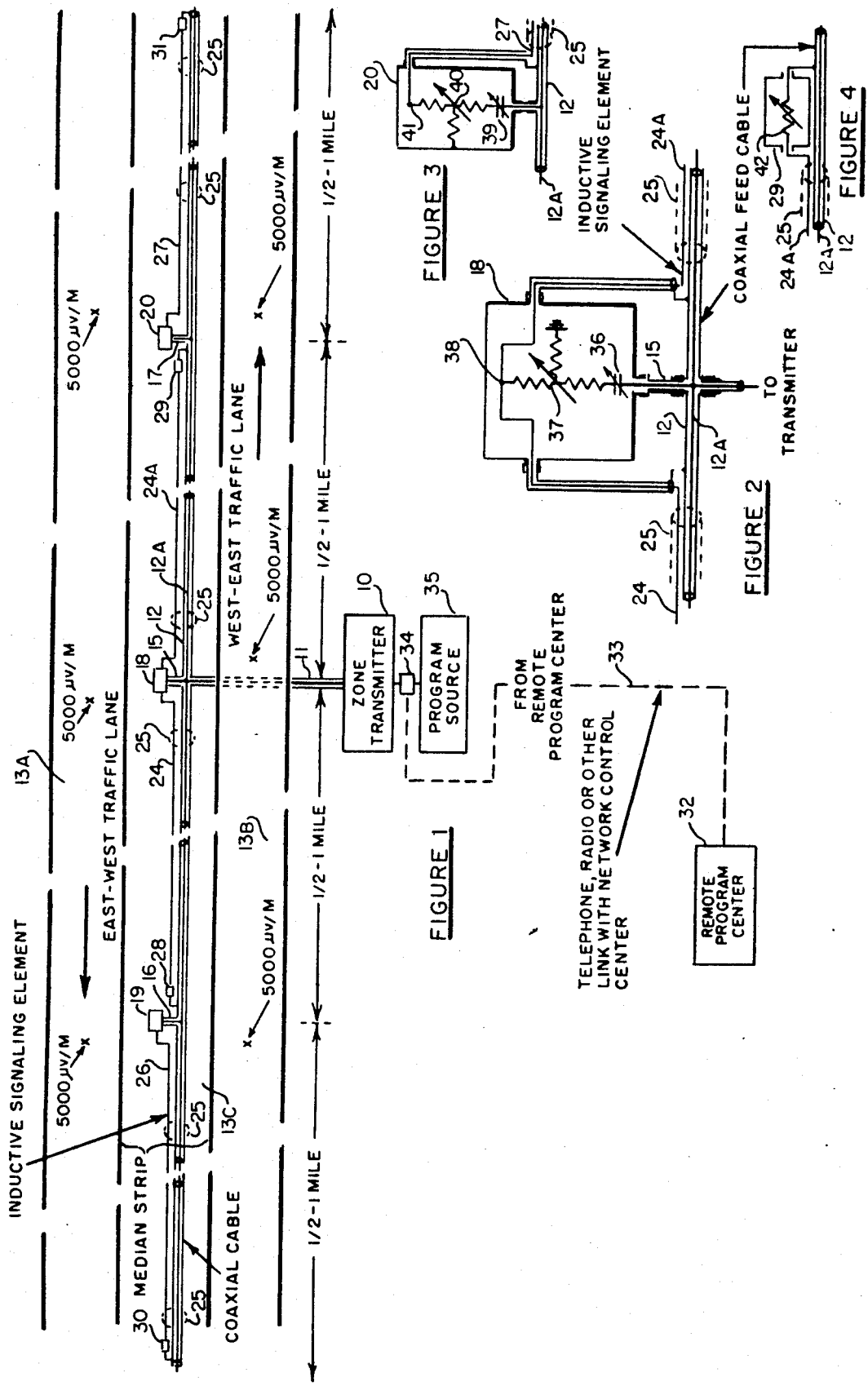

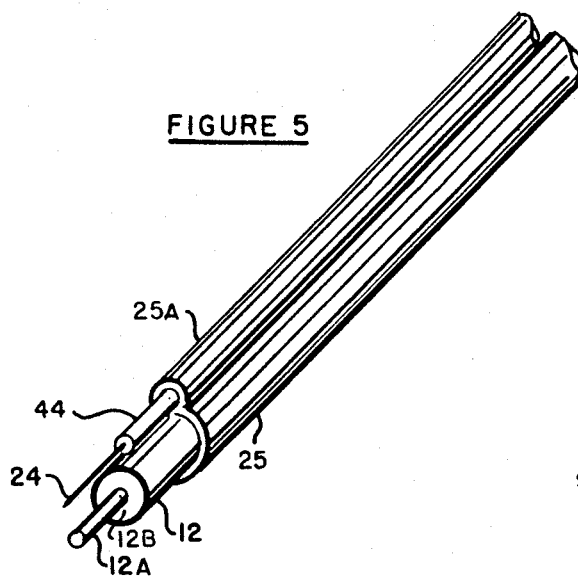
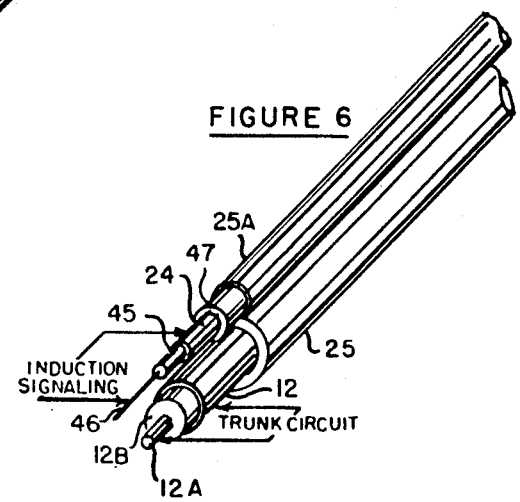
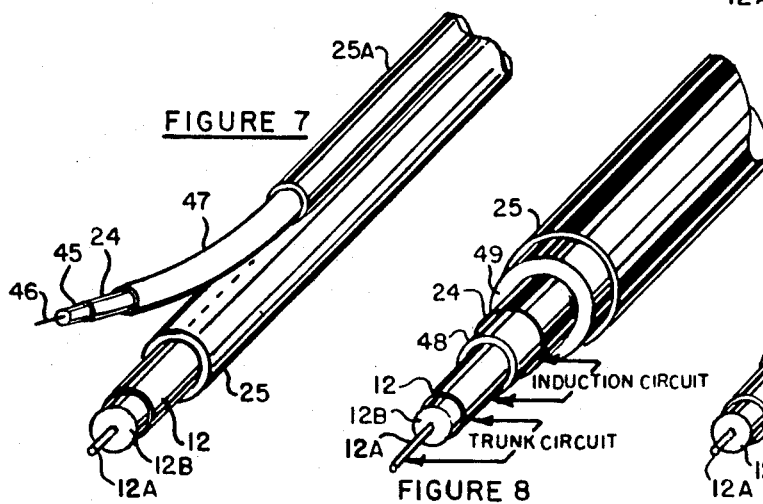
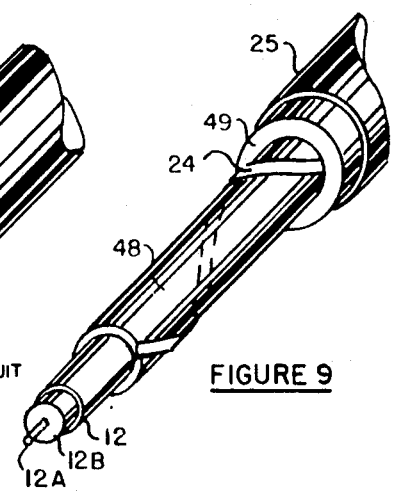
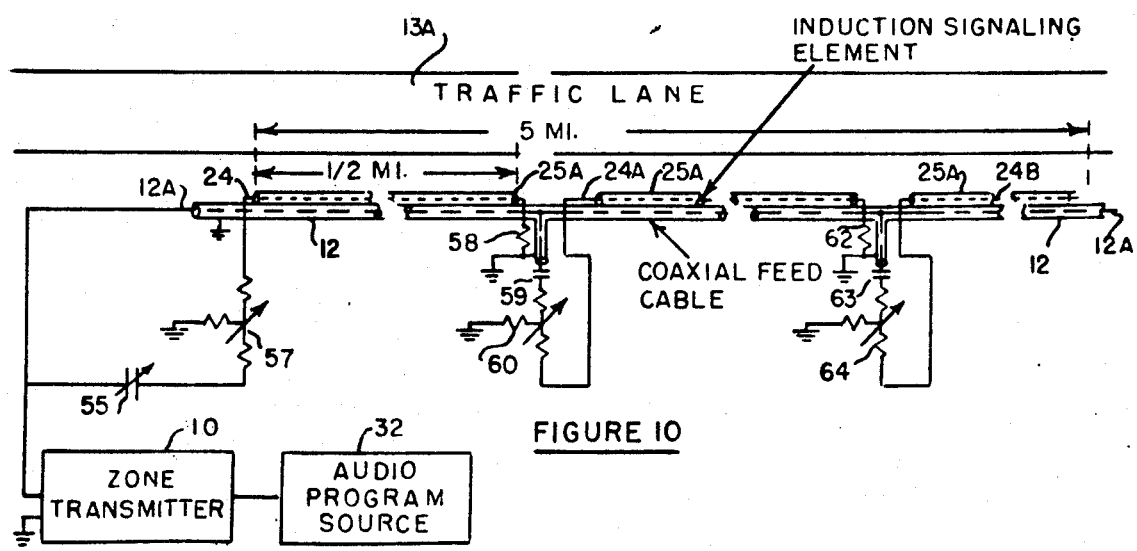

INDUCTIVE CARRIER COMMUNICATION SYSTEMS

BACKGROUND OF THE INVENTION

This invention relates to improvements in communication systems of inductive-carrier type and, more particularly, this invention relates the use of such communication systems for the transmission of the sound portion of motion pictures or the like in drive-in motion picture theaters directly to the radios of automobiles parked within the theater area.

The drive-in motion picture theater is a theater designed for the showing of motion pictures wherein the audience drives their automobiles into the theater area and parks in designated parking spots in view of a large screen. Normally, sound is transmitted to each car by means of portable speaker which is detachably mounted on a stanchion post near such designated parking spot. The speaker is removed from the post and placed in each automobile during the viewing of the film. Sound signals are transmitted by means of underground wires from the projection booth to each post, through wires in each post and thereafter through wires from the post to the speaker. The signal is transmitted from the sound amplifier in the projection room to the speaker in each automobile in much the same manner as a signal is transmitted in a home sound system.

There are many inherent disadvantages to such a system. Each car must be exactly positioned in close proximity to the speaker posts. Each of the individual speakers must be maintained by the theater. It is common for cars to attempt to leave the theater at the end of the show without removing the speaker and thus cause damage to the post, the speaker and the car itself. Additionally, drivers commonly hit the speaker posts by accident during manuevering in parking. As can be seen from the above, the maintenance of such an exposed system is comparatively expensive. Also, the sound quality is much inferior to that in enclosed theaters because of the use of very small speakers employed in drive-in theaters in order to accommodate the speakers to the stanchion posts that support that speakers.

As will be more fully discussed hereafter, the present invention comprises the use of an inductive-carrier electro-magnetic transmission system of localized type whereby the sound portion of the motion picture is transmitted to the car radios of the automobiles parked within the theater area. Many systems of the inductive-carrier type, including those of the applicant, have been employed in the past for localized restricted-range transmission on highways, at airports and on railroads. To applicant's knowledge no such system has ever been adopted and employed for use with automobile radios in drive-in motion picture theaters and the like. The past uses of such inductive-carrier type systems have presented serious technical problems when operated without license under the low-power rules of the Federal Communications Commission (FCC) of the United States and when using relatively-high carrier frequencies, such as those in the standard (medium wave) broadcast band. Radiation of electrical wave energy which is an inherent characteristic of inductive-carrier systems when operated at radio frequencies, often extends over distances far in excess of the permissible field-strength limit specified by the U.S. Government and others for unlicensed radio devices of restricted-range type. While it has been possible, by careful adjustment of radio frequency (r.f.) carrier level to comply with the Government's rules in certain localized applications, such as the highway radio system installed by the applicant on the George Washington Bridge, New York City, in 1940, experience in most cases has demonstrated that it is extremely difficult, and in some instances impossible, to comply with the Government's rules over any substantial period when unattended transmitters are employed and, at the same time to maintain a sufficiently strong induction field at broadcast frequencies to enable good reception in radio-equipped cars traveling over lengths of highway served by the system.

Experience with roadside conductors of various types, including single and dual-conductor transmission lines has indicated that the strength of the induction field about these conductors is subject to substantial variation along their length. Near the transmitter source, for example, the field strength may be too high to comply with the Government's rules at broadcast frequencies if a strong, noise-free signal is to be provided in the desired reception area. In addition, if the cable is installed below the surface of the ground as would be required for use in drive-in theaters where above-surface installations would not be desirable, variations in the inductive-signaling field due to changes in soil conductivity under different weather conditions and other irregularities in environmental conditions would present difficulties over a substantial period of time in maintaining a reasonably-constant field strength and restriction of radiation within limits set by the Government.

Moreover, experience with conventional forms of cables, or wires, when employed as r.f. signal conductors for the purpose of producing an induction-signaling field as a means of impressing carrier-signal energy on the antenna system of radio brodcast receivers carried by motor vehicles indicates that the coupling loss between the vertically disposed vehicle antenna and the horizontally-polarized signals from the cable system is unnecessarily high. This results in requirement of substantially more r.f. power in the cable system than would be required if a convolutive field, having vertical and horizontal polarization characteristics, were provided. The present system as employed in drive-in theaters incorporates as an important element what are believed to be unusual and novel means for developing such a convolutive field to produce a signal of maximum strength in receiving systems of motor vehicles carrying conventional antennas. This, in turn, assists in meeting the requirements of the Government with respect to restricted-range radio devices.

SUMMARY OF THE INVENTION

The present invention eliminates the inherent problems of the post and speaker system commonly employed in drive-in theaters by the use of an inductive cable or cables buried beneath the ground in the reception area in which automobiles viewing the motion picture are to be parked. The cable is of such design that when combined with an inductive amplitude modulated radio-frequency signaling means, a relatively uniform amplitude-modulated electromagnetic field of desired strength and of a frequency which is within the normal reception range of car radios (i.e. the standard broadcast band) is established throughout only the area where the automobiles are parked. The cable design as shown hereafter offers practical solutions to the problems previously had with induction radio as set forth above. By use of the present cable positioned as disclosed herein, it is possible to produce a uniform signal over a restricted area. Outside the designated reception area, signal strength quickly diminishes. Thus, at most locations, the signal cannot be received by those who park without fee near the theater but outside the designated reception area. Reception outside the designated area can be further limited by use of a security transmitter that feeds a small amount of radio frequency power to a cable positioned around the designated area which transmits an interfering signal at the same frequency as the signal in the designated reception area. To prevent unauthorized reception outside of the designated reception area because of signals induced on power lines and the like, an interfering signal may be impressed on all such lines passing outside and near the theater area. These precautions are, of course, necessary to insure that people are not above to hear the theater presentation without payment of entrance fee. These and other improvements as presented by the system of the invention are described in subsequent pages.

It is therefore, an object of the present invention to provide an inductive-carrier communication system for use in drive-in theaters which will eliminate the need for the inferior post-and-speaker system of the prior art and provide a uniform amplitude-modulated signal of high audio quality throughout only the viewing area, which may be received on the standard broadcst band of automobile car radios.

It is an additional object of this present invention to provide means whereby drivers of cars on the outside of the drive-in theater may be prevented from hearing the sound associated with the film being shown by theater, especially along roads in the immediate vicinity of the theater where the picture can be seen outside of the drive-in premises.

It is additionaliy an object of this present invention to make such induction system so that it is highly efficient, meets Government requirements as to field strength and will provide a signal of maximum intensity in radio receivers in vehicles employing conventional antennas by providing an induction field having vertical and horizontal polarization characteristics.

DESCRIPTION OF THE DRAWINGS

Other objects of the present invention will be readily apparent from the following description and drawings in which:

FIG. 1 is a diagrammatic view of one embodiment of the inductive-carrier communication system of the present invention as employed in roadside use;

FIG. 2 is a schematic view of one form of signal attenuating and line-coupling means that may be used in the inductive-carrier communication system of the present invention;

FIG. 3 is a schematic view of another form of a signal attenuating and line-coupling means that may be used in the inductive-carrier communication system of the present invention;

FIG. 4 is a schematic view of an inductive-signaling line-termination unit that may be used in the inductive-carrier communication system of the present invention;

FIG. 5 is a perspective view of one embodiment of the cable structure of the present invention;

FIG. 6 is a perspective view of another embodiment of the cable structure of the present invention;

FIG. 7 is a perspective view of yet another embodiment of the cable structure of the present invention;

FIG. 8 is a perspective view of still another embodiment of the cable structure of the present invention;

FIG. 9 is a perspective view of a further embodiment of the cable structure of the present invention;

FIG. 10 is a schematic view of an inductive-carrier communication system of the present invention utilizing the cable structure shown in FIG. 5;

DETAILED DESCRIPTION OF THE EMBODIMENT

DESCRIPTION OF FIG. 1

Figure 11:
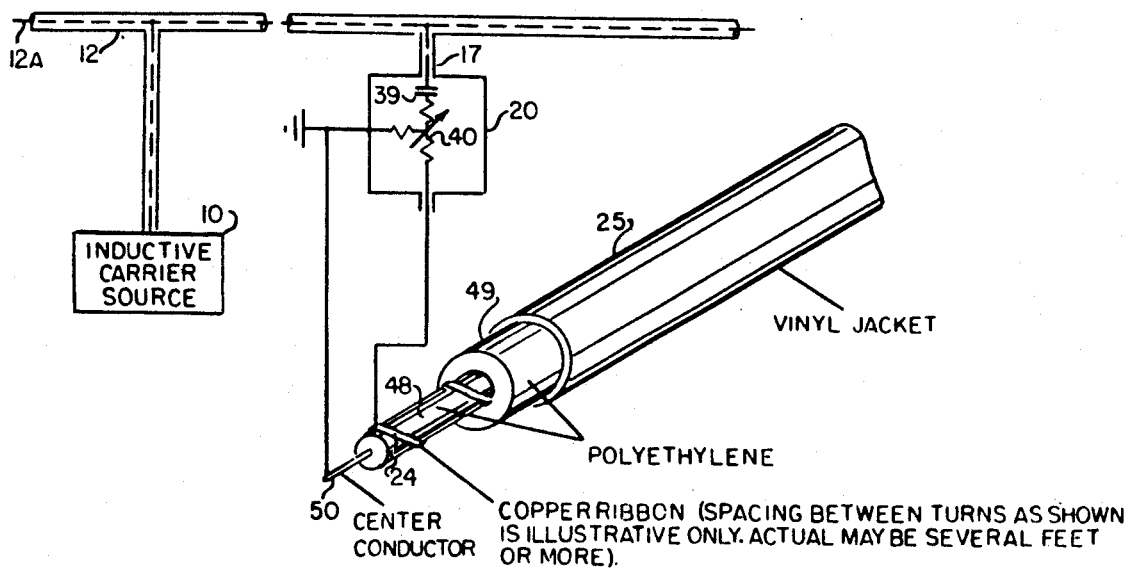
FIG. 11 is a partially perspective, partially schematic view of an inductive-carrier communication system of the present invention utilizing a modification of the induction cable.

An illustrative application of the carrier system of the present invention employed in roadside use is shown in FIG. 1 in which a carrier transmitter 10, in this case operating at a broadcast frequency of 540 kilocycles, is connected by coaxial cable 11 to a roadside cable 12–12A extending parallel to traffic lanes 13A and 13B carrying vehicle traffic in opposite directions. In coaxial cable 12-14 12A, the center conductor is denoted by 12A and the ground sheath conductor is denoted by 12. At intervals along coaxial cable 12–12A, preferably installed below the surface of the roadway or the adjoining area thereof, a controlled amount of radio frequency (r.f.) carrier energy is applied by means of coaxial branch connections 15, 16 and 17 and adjustable coupling and attenuating means 18, 19 and 20 to longitudinally-extending conductors 24,24A, 26 and 27, respectively, which serve as the inductive-signaling elements of the system.

As will be described hereinafter, these inductive-signaling conductors may be incorporated as an inherent part of the roadside coaxial cable 12-14 12A and contained within the same cable structure or jacket 25, or the inductive-signaling elements may otherwise be associated with the coaxial cable 12–12A in fixed circuit and spacial relationship. The ends of inductive-signaling elements 24,24A, 26 and 27 are connected through termination units 28, 29, 30 and 31 respectively to the common metallic ground circuit provided by the sheath 12 of coaxial cable 12–12A. Inasmuch as the inductive-signaling elements 24,24A, 26 and 27 have a fixed and uniform impedance relationship with respect to the common ground sheath 12 of the coaxial cable, the inductive transmission line formed by each of these elements and ground sheath 12 can be terminated readily in such a manner as to match the characteristic impedance of each line section at the broadcast carrier frequency employed throughout the length of roadway system.

As illustrated in FIG. 1, inductive-signaling elements 24, 24A, 26 and 27 are disposed along the coxial cable 12–12A in contiguously sequential manner to provide a continuous and substantially uniform induction field at a common carrier frequency in order that signals as received in radio-equipped vehicles traveling throughout the length of the roadway served by the system will be uninterrupted and of substantially-constant strength as the vehicles pass through the individual signaling zones created by the inductive fields from the conductors 24, 24A, 26 and 27. a vehicle traveling from west to east on traffic lane 13B would, for example, hear the transmitted signals on 540 kilocycles first from inductive-signaling conductor 26, then from conductors 24, 24A and 27 in sequence without material change in received signal level or break in reception. Objectional change in strength of the induction field extending throughout the length of roadway shown in the illustration is prevented by minimizing any reflection from the terminal units 30, 28, 29 and 31. Such reflection otherwise would result in standing waves along the conductors 26, 24, 24A and 27, causing variation in the field and undesired radiation of wave energy over distances in excess of limits designated by the Governement for unlicensed lower-power radio devices of restricted-range type.

An important advantage of the arrangement shown in FIG. 1 is that a substantial amount of carrier energy may be impressed on coaxial cable 12–12A in order to serve a relatively long stretch of roadway, but by means of the attenuators 19, 18, and 20 the amount of carrier energy supplied to each individual inductive-signaling conductor 26, 24, 24A and 27 may be regulated so that the inductive field surrounding each conductor may be controlled within desired limits. Thus, the system can be adjusted to provide a desired field strength, such as 5,000 microvolts per meter, at different points along the center of traffic lanes 13A and 13B without objectionable radiation of wave energy to points removed from the right-of-way.

The roadside transmitter 10 may be connected with a remote control or program center 32 by means of a telephone line 33 or any other suitable wireline or radio communication circuit. Alternately, the transmitter 10 may be connected by any well-known type of switching means, 34 locally or remotely controlled with a local program source 35 at the roadside location. The latter may be any well-known type of repeating magnetic-tape reproducing and/or recording device on which messages addressed to motorists can be recorded and continuously repeated, a microphone, or any other suitable source of information or signals to be transmitted to receiving equipment carried by vehicles traveling along the traffic lanes served by the system.

DESCRIPTION OF FIG. 2

One arrangement of r.f. carrier energy from the center conductor 12a of coaxial trunk cable 12—12A is applied through coaxial branch connection 15 and adjustable or fixed coupling capacitor 36 to adjustable attenuator 37, of any suitable well-known type, such as the resistive T network shown, which presents a substantially constant impedance at input and output terminals with variation of the attenuator. The output terminal 38 is connected with inductive signaling elements 24 and 24A, forming a part of wayside cable 25 comprising the coaxial trunk cable 12—12A and the inductive-signaling elements held in fixed spacial and impedance relationships as will be more fully described hereinafter. It will be noted by use of the T connecting of the output terminal 38 with inductive-signaling conductors 24 and 24A, signal energy may be carried in two directions along the roadway from line-coupling and attenuator unit 18, thus minimizing the number of coupling-attenuator units required along a given length of roadway. In addition, this arrangement produces two induction fields of equal strength and opposite direction at any given instant, hence tending to cancel signal voltage that may be induced on wayside electric-power or telephone lines extending adjacent conductors 24 and 24A thereby extending the range of the signals beyond the desired limits of the right-of-way and presenting a potential source of interference with other systems or services at points remote from the roadway. The coupling capacitor 36 preferably has a small capacity value in order to minimize any voltage-attenuating effect on the trunk circuit presented by coaxial cable 12—12A.

DESCRIPTION OF FIG. 3

Referring now to FIG. 3, there is shown an r.f. line-coupling and attenuator unit such as 20, FIG. 1, which provides signal energy at its output terminal 41 in only one direction. As shown signal energy from the center conductor 12A of coaxial cable 12–12A is applied through an adjustable or fixed coupling capacitor 39 to adjustable attenuator 40, of resistive type. Output terminal 41 of attenuator 40 is connected to inductive signaling element 27 which may, as shown, be contained within the same cable structure 25 as the coaxial trunk cable 12–12A.

DESCRIPTION OF FIG. 4

Referring now to FIG. 4, there is shown in greater detail the inductive-signaling line termination unit such as 29 of FIG. 1. As shown, termination unit 29, to which conductor 24A is connected, comprises an adjustable or fixed resistor 42, preferably of non-inductive type 43 to match the characteristic impedance of the r.f. transmission line at its operating frequency (this line comprising inductive-signaling conductor 24A and ground sheath 12 of coaxial cable 12–12A) thus preventing reflection of signal energy back along the line with consequent possible formation of standing waves and attendant radiation

DESCRIPTION OF FIG. 5

Referring now to FIGS. 5 to 9, there are shown alternative embodiments of a new and improved cable structure which may be employed in the inductive carrier communication system of the present invention. The embodiment of the cable as shown in FIG. 5, comprises a center conductor 12A and coaxial sheath 12 separated by dielectric sleeve 12B. This coaxial portion of the cable is employed for trunk-circuit use in transmitting carrier or other signals for long distances along the roadway served by the system. An inductive-signaling conductor 24, fabricated of copper, aluminum or other suitable conductive material in solid or stranded form is supported within dielectric sleeve 44 at a fixed distance from coaxial ground sheath 12 by means of a common protective insulting jacket 25–25A. The dielectric sleeve 44 is fabricated of polyethylene or other suitable insulating material possessing good dielectric properties at the radio frequency or frequencies employed in the system. Jacket 25–25A may be of any suitable and commonly-used insulating material such as vinyl plastic. As the inductive-signaling conductor 24 is held at a fixed impedance relationship as a part of the transmission line in which sheath 12 is the ground conductor and the transmission line has a given impedance value, a combined coaxial trunk relay and inductive-signaling cable of this type may readily be installed and provided with proper termination to minimize radiation. At the same time, such cable structure minimizes difficulties that would be presented in supplying r.f. energy from the center conductor 12A of coaxial cable 12–12A to conductor 24 at different points along the cable.

DESCRIPTION OF FIG. 6

A second embodiment of a combined coaxial trunk and inductive-signaling cable structure is shown in FIG. 6 wherein center conductor 12a and coaxial sheath 12 are similar to those shown in FIG. 5. However, in this cable structure the inductive-signaling conductor 24 is in the form of a coaxial copper sheath in order to present maximum skin surface and thereby minimize losses in the conductor at broadcast frequencies. Within sheath 24 are dielectric sleeve, 45, of polyethylene or other suitable insulting material, and center conductor 46 which is held at ground potential. (The same reference numeral 24 is used throughout this application to identify the inductive-signaling conductor; the same reference numerals 12–12A also are utilized throughout the specification to denote the coaxial trunk cable employed for trunk relay and to supply r.f. energy to the inductive-signaling conductors.) Both the inductive-signaling line 24–46 and the coaxial cable 12–12A are held within a common insulating jacket 25–25A. inductive-signaling element 24 being supported within jacket 25A by means of dielectric sleeves 45 and 47 of polyethylene or other suitable dielectric material.

DESCRIPTION OF FIG. 7

A modification of the inductive-signaling cable shown in FIG. 6 is illustrated in FIG. 7 in which center conductor 12A and sheath conductor 12 of coaxial cable 12–12A are enclosed in insulating protective jacket 25. The inductive-signaling element, sheath conductor 24, dielectric sleeves 45 and 47, and center ground conductor 46 are held in an insulating protective jacket 25a which is removably attached to jacket 25 to facilitate circuit connections. In effect, however, the arrangement forms a single cable which may be laid in the ground, in roadway or drive-in theater surfaces or otherwise installed with minimum of difficulty.

DESCRIPTION OF FIG. 8

An additional embodiment of a combined inductive-signaling and coaxial trunk cable is shown in FIG. 8. As shown coaxial elements 12 and 12A are similar to those illustrated and described heretofore. As in the case of FIG. 7, the inductive-signaling element 24, as in FIG. 7, is the form of a conducting sheath which presents maximum skin surface to minimize losses at radio frequencies in the standard broadcast band. A suitable dielectric sleeve 48, such as polyethylene, is used between inductive-signaling conductor 24 and coaxial ground sheath 12, both in coaxial relationship. A dielectric sleeve 49 having a wall thickness substantially greater than that of inner sleeve 48 is employed to minimize losses when the cable is buried in earth or in physical contact with conducting materials such as metal surfaces of bridges or tunnels, railings on which the cable is supported and the like. A protective insulating jacket 25, fabricated of suitable material such as vinyl plastic, is employed as shown. The inductive transmission line in this cable structure is formed by outer sheath 24 and inner ground sheath 12, establishing impedance of the circuit.

DESCRIPTION OF FIG. 9

A further embodiment of a combined inductive-signaling and coaxial trunk cable is shown in FIG. 9. Center conductor 12A and coaxial ground sheath 12 are held in dielectric sleeve 48 about which is positioned in convolutive manner a conducting strip 24 of copper, aluminum or other suitable conductor which forms the inductive-signaling element of the cable. As shown in the illustration, the spiral conducting strip 24 is held within a relatively thick-walled dielectric sleeve 49. A protective insulating jacket 25, of vinyl plastic or other suitable material surrounds dielectric sleeve 49. The inductive-signaling line in this case is formed by conducting strip 24 and coaxial ground sheath 12, with fixed impedance presented by the line.

DESCRIPTION OF FIG. 10

Referring now to FIG. 10 there is shown in schematic form the roadside use of an inductive-signaling cable of the type shown in FIG. 5. An r.f. carrier modulated by audio signals from program source 32 is supplied by transmitter 10 at a designated frequency in the broadcast band to the roadside coaxial cable formed by inner conductor 12a and ground sheath 12, extending along traffic lane 13A. A relatively small amount of r.f. carrier energy is applied from coaxial center conductor 12A through coupling capacitor 55 and adjustable attenuator 57 to inductive-signaling conductor 24 supported within jacket 25A and positioned in fixed relationship with respect to ground sheath 12 as illustrated in FIG. 5. The inductive transmission line formed by conductor 24 and ground sheath 12 is terminated by resistor 58, assuming inductive or capacitive reactances have been balanced out. At a given distance along the cable, such as ½ mile, coupling capacitor 59 and r.f. attenuator 69 enables a desired amount of r.f. signal voltage from center conductor 12A of coaxial cable 12–12A to be applied to inductive-signaling conductor 24A, serving its individual section of roadway, and extending to termination resistor 62, connected between conductor 24A and ground sheath 12. In similar manner, r.f. signal energy from center conductor 12A of coaxial cable 12–12A is applied through coupling capacitor 63 and adjustable attenuator 64 to inductive-signaling element 24B. By proper adjustment of attenuators, 57, 60 and 64, the induction field extending along the cable system may be established in such manner that a substantially uniform and strong signal is received in radio-equipped cars traveling along the traffic lane 13A throughout the length of that portion of the system shown in the illustration.

DESCRIPTION OF FIG. 11

In the illustrative arrangement shown in FIG. 11, r.f. signal energy at a designated carrier frequency in the standard broadcast band is applied from carrier source 10 through coaxial trunk cable 12-12A and coaxial branch connection 17 to coupling capacitor 39 and adjustable attenuator 40, of coupling and attenuator unit 20, to the inductive transmission line formed by conductor 24, disposed in coaxial relationship to center conductor 50, held at ground potential. Conductor 24 is separated from center conductor 50 by a dielectric sleeve 48, formed of polyethylene or other suitable insulating material. To minimize effect of the medium in which or on which the cable is laid, a relatively thick-walled dielectric sleeve 49, such as polyethylene, surrounds the inductive-signaling conductor 24, while an insulating protective jacket 24, fabricated of vinyl plastic or other suitable material, comprises the outer shell of the cable.

As indicated by the illustration, the wall thickness of the inner dielectric sleeve 48 is preferably substantially less than that of the outer dielectric sleeve 49. This arrangement permits the impedance of the inductive transmission line formed by spiral conductor 24 and center conductor 50 to be established primarily by the relationship between these two conductors, with minimum changes in line characteristics or losses because of variations in soil conductivity or other external factors. The inductive-signaling cable shown in FIG. 11 may be employed on roadways where it may be desirable to utilize separate inductive-signaling cables fed by r.f. signal energy from a conventional coaxial cable, such as 12-12A for trunk relay between terminal points.

DESCRIPTION OF FIG. 12

Figure 12:
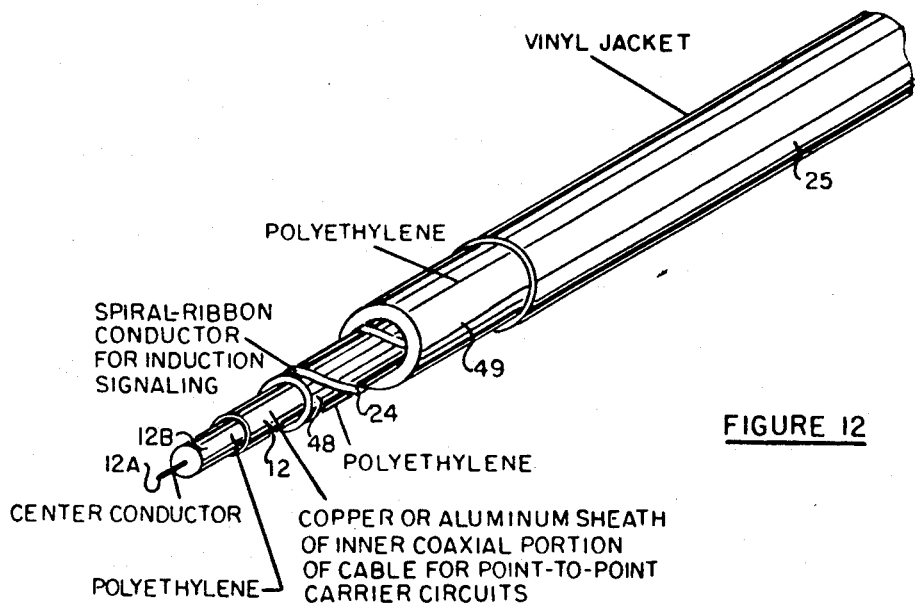
FIG. 12 is an enlarged perspective view of the embodiment of the cable of the present invention shown in FIG. 9.

FIG. 12 is an enlarged detail of the combined coaxial trunk and inductive-signaling cable shown in FIG. 9. This illustration also more clearly shows the relatively-large wall thickness of the outer r.f. dielectric sleeve 49 employed in this illustrative form of cable as compared with the inner coaxial dielectric sleeve 48 that separates inductive-signaling conductor 24 from inner coaxial ground sheath 12.

Ths illustration of FIG. 12 also emphasizes the difference between this inductive-signaling cable structure and that of conventional coaxial cables that have as basic purpose the confinement of all signal energy within the outer ground sheath in order to minimize transmission loss in carrying signal energy from one terminal to another. Conventional coaxial cables have no provision for establishing means whereby the signal energy carried by the cable may also be employed to establish an external inductive-signaling field of substantially uniform and controlled nature for use in communicating with radio equipment carried by vehicles traveling parallel to the cable and at a substantial distance therefrom.

The cable shown in FIG. 12 also differs basically in design and function from double-shielded coaxial (triaxial) cables such as employed in community television systems to minimize radiation from the cable in order to prevent unauthorized viewers from intercepting the programs for which subscribers pay. In these double-shielded (triaxial) cables, both conducting sheaths are at ground potential and in direct electrical contact. There is no dielectric between the two ground sheaths, and except for a protective jacket there is no thick-walled dielectric such as polyethylene sleeve 49 disposed between the outer ground sheath and the jacket. All available types of coaxial cable having an outer insulating jacket employ the latter only for protective purposes, and the wall thickness of the jacket is determined by mechanical rather than radio-frequency transmission-loss factors.

DESCRIPTION OF FIG. 13

While the inductive-carrier communication system of the present invention has been shown in conjunction with highways for roadside use, it can be used in drive-in motion picture theaters to transmit the sound portion of motion pictures to the radios of the automobiles in attendance.

In a drive-in motion picture theater, the audience in their automobiles 200, after payment of the entrance fee, are admitted into the theater area and allowed to park in designated parking spaces in view of the motion picture screen 201. The parking spaces are positioned on and along continuous ramps 202 in front of the screen 201. The ramps 202 raise the front ends of the automobiles to enhance the automobile occupants' view of the screen. Since the spaces are along the ramps 202, they form rows in front of the screen 201. Normally in prior forms of drive-in motion picture theaters the sound is transmitted to each car by means of a portable speaker system detachably mounted on a post adjacent in each designated parking spot. The use of the communication system of the present invention eliminates the need for use of such speakers and posts. The inductive signaling conductor 203 according to the present invention is positioned underneath at least some of the ramps 202 in proximity to the car antenna 204 of each radio equipped vehicle. The inductive signaling conductor 203 has impressed on it a carrier signal modulated to transmit the sound portion of the motion picture shown on the screen. The signal is received by the antennas 204 of each of the automobiles in attendance and is thereafter played through each of the automobile's radios.

Figure 13:
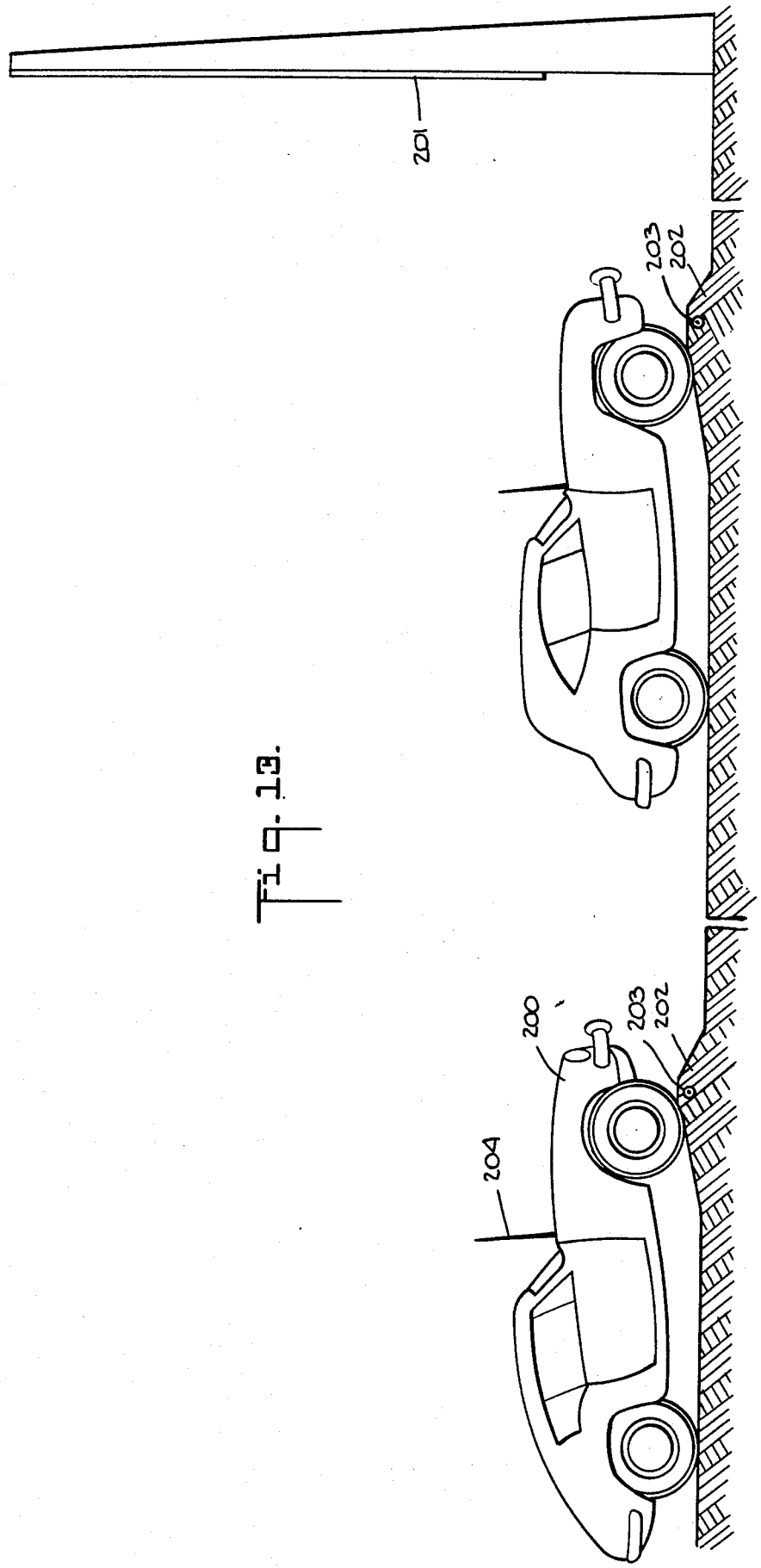
FIG. 13 is a partially sectional perspective view of a portion of a drive-in motion picture theater showing an inductive-signaling cable buried in two of the parking ramps of the theater, which ramps position the cars to properly view the screen.

In FIG. 13, the inductive-signaling conductor 203 may be buried in the ramp 202 or otherwise disposed within a short distance from the car antenna 204.

To form inductive-signaling conductor 203, any of the cable structures described heretofore may be used including the embodiments of FIGS. 5, 6, 7, 8, 9, 11 and 12. Equally any of the coupling and terminating structures previously disclosed may be used to connect and ground the cables in carrying forward the use of the present inductive-carrier communication system in drive-in motion picture theaters.

Because of the configuration of the cable of the present invention, particularly as shown in FIGS. 11 and 12, and because of the relative positioning of the automobiles and the inductive-signaling conductor 203, a high level of efficiency of transmission of the signal between the inductive-signaling conductor 203 and each automobile antenna 204 may be accomplished. The configuration for positioning the inductive-signaling conductor 203 in the theater area which produces the best reception for all of the automobiles in the reception area, is when the inductive-signaling conductors 203 are positioning as shown along each of the rows of parking spaces formed along the ramps 202, as shown in FIG. 14.

Figure 14:
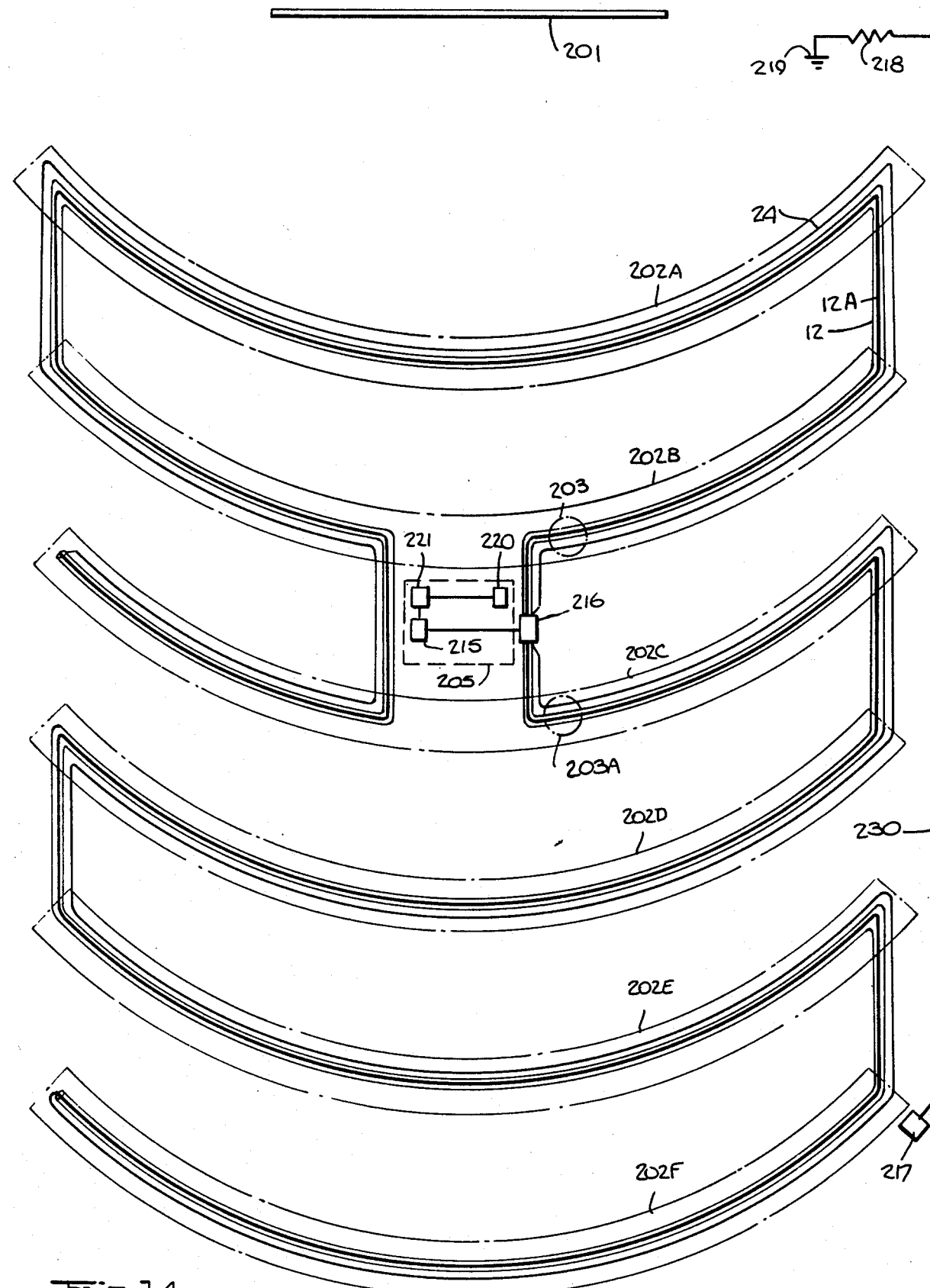
FIG. 14 is a diagrammatic view of an inductive-carrier communication system of the present invention as employed in use in drive-in motion picture theaters.
Figure 15:
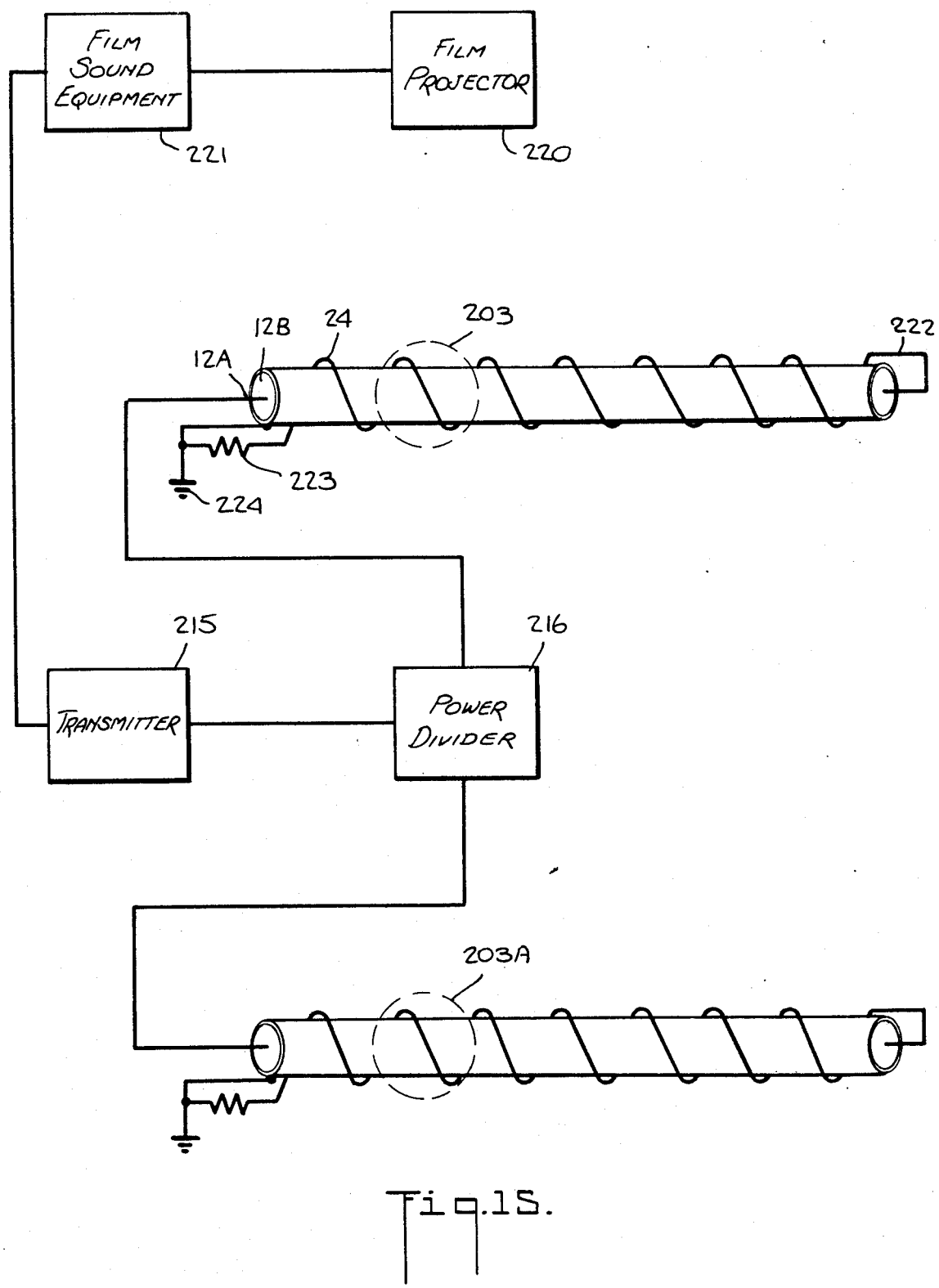
FIG. 15 is a diagrammatic view of a portion of the inductive-carrier communication system and projection room equipment of the present invention as employed in use in drive-in motion picture theaters.

DESCRIPTION OF FIG. 14 and 15

FIG. 14 shows in diagrammatic form, a drive-in motion picture theater according to the present invention. The screen 201 upon which the motion picture is projected is positioned for easy viewing throughout the theater parking area. The ramps 202 (A–F) are arranged in concentric arcs in front of the motion picture screen 201. Opposite and some distance from the screen is positioned the projection room 205, containing projection equipment 220 for displaying a picture upon the screen 201. The projection room 205 also contains film sound equipment 221 and a radio transmitter 215 for modulating the carrier wave energy from said transmitter in accordance with the sound portion of the motion picture being shown. The r.f. generator is coupled by means of a power divider 216 of any well-known type to induction cables 203 and 203A which run in an S or zigzag pattern along the rows of parking spaces. As seen in FIG. 14, these inductive signaling conductors 203 and 203A may be formed by combination cables of the type shown in the embodiments of FIGS. 5, 6, 7, 8, 9 or 12. As disclosed previously, the transmitter 25 is operatively connected to the center portion 12A of each such combination cable. Each center conductor 12A is shielded by means of a conducting sheath 12 surrounding it, held at ground potential.

As seen in FIG. 15, at the end of the inductive-signaling conductors 203 and 203A, farthest from the projection room 205, the inductive-signaling elements 24 of each of the combination cables forming inductive signaling conductors 203 and 203A, is operatively connected to the corresponding central shielded portion 12A of the combination cable. The inductive-signaling element 24 of each of the inductive-signaling conductors 203 and 203A is terminated through a load resistor 223 to the sheath 12 which is held at ground potential.

Alternatively, the embodiment of cable shown in FIG. 11 may be used to form inductive-signaling conductors 203 and 203A. As seen in FIG. 11, the inductive-signaling element 24 would be operatively connected to the transmitter 215 at one end and and would terminate at the other, as previously explained, by coupled to ground potential.

In large installations more than two inductive-signaling conductors may be used to cover the parking area or in the alternative, when combination cable such as in FIG. 12 is used, several inductive-signal elements along each combination cable may be used.

While, with the cable structure and the positioning as disclosed heretofore, signal strength falls away rapidly when outside the theater area, other measures may be taken to insure that parties who have not paid the entrance fee may not park their automobiles outside the theater area and still receive the signal on their radios. One or more inductive-signaling cables 230, of the type disclosed in FIG. 11 or its equivalent may be positioned around an outside portion of the theater area where protection against unauthorized reception is desired. If necessary, such cable or cables may be used to almost completely surround the theater area. The cable 230 should be coupled to an r.f. transmitter 217 located at the outer edge of the drive-in theather and may be terminated through load resistor 218 to ground 219 at the other end. The security transmitter 217 should emit a carrier signal at the same frequency as that being impressed on inductive-signaling conductors 203 and 203A. The carrier wave from security transmitter 217 should be modulated with an interfering signal of white noise or other sounds different than that being impressed on inductive-signaling conductors 203 and 203A. Accordingly, one positioned outside the designated theater area would receive the white noise or other protective signal which would cause interference with the signals received from the inductive-signaling conductors 203 and 203A within the theater area. This interference would inhibit unauthorized listening to the sounds associated with the picture.

Some of the signal transmitted by inductive-signaling conductors 203 and 203A may be carried outside the designated area by undersirable coupling to power transmission lines, other conductors and the like located outside but in the immediate vicinity of the theater area. To prevent power lines and the like from transmitting an intelligible signal outside the theater area, an interfering signal at the same frequency as the signal in said inductive-signaling means 203 and 203A of white noise and other appropriate sound may be directly or indirectly induced on such line to interfere with reception outside the theater premises.

It is preferably to locate the inductive-signaling conductor along each row of designated parking spaces in order that the signal be in close proximity to the car antennas. This insures a comparatively noise-free signal even when electrical storms exist in the vicinity of the theater. It is possible, however, to position the inductive-signaling conductor along only some of the rows of designated parking spaces and provide acceptable reception.

DESCRIPTION OF FIG. 16

Figure 16:
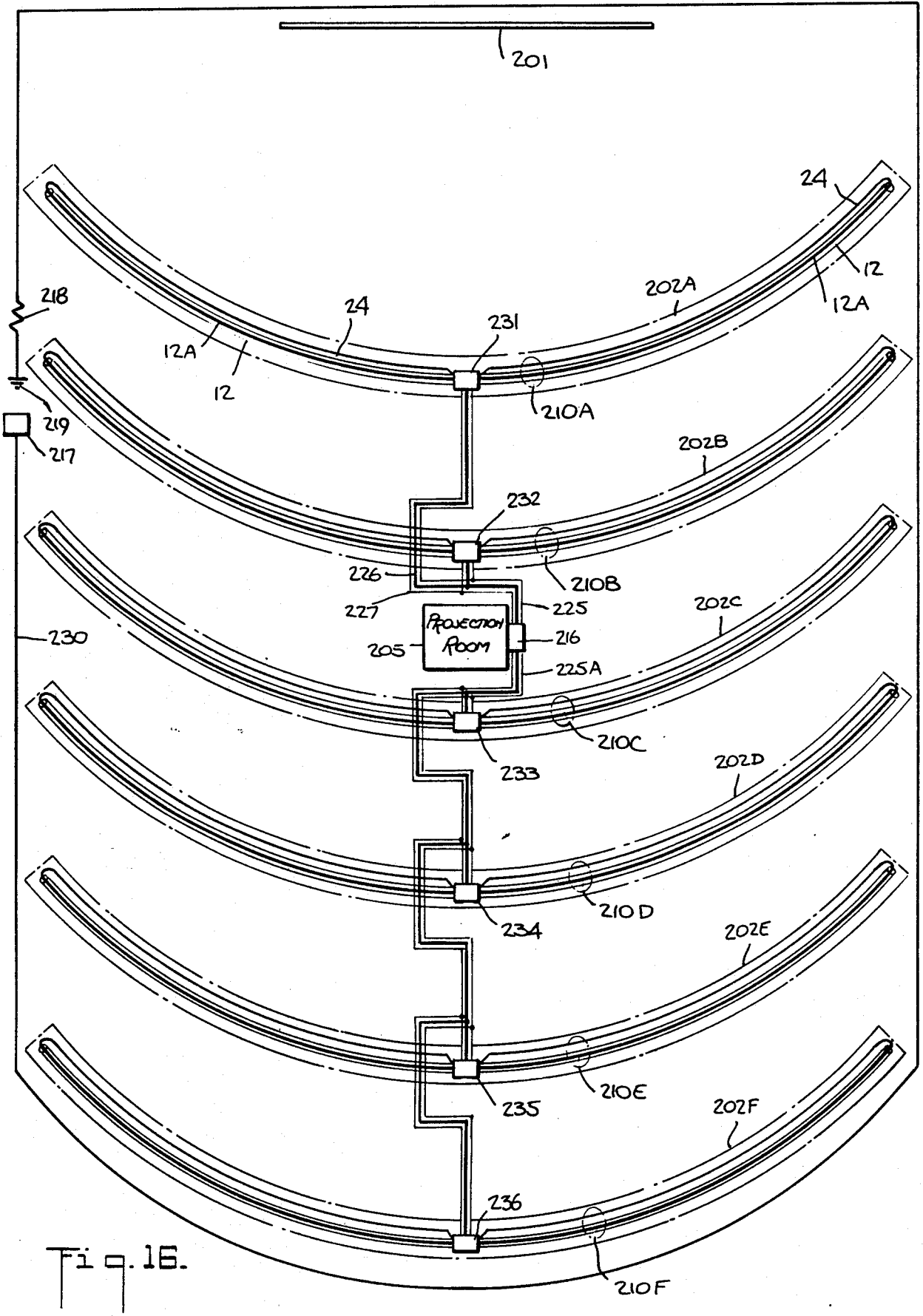
FIG. 16 is a diagrammatic view of an alternative arrangement of the communication system of the present invention as employed in drive-in motion picture theaters.

FIG. 16 shows an alternative arrangement of the cable system in a drive-in motion picture theater according to the present invention. The screen 201 upon which the motion picture is projected is positioned for viewing throughout the theater parking area. The ramps 202 (A-14 F) are arranged in concentric arcs in front of the screen 201. Opposite and some distance from the screen is positioned the projection room 205 containing, as shown in FIG. 15, projection equipment 220 for displaying a picture upon the screen 201, film sound equipment 221 and a radio transmitter 215 for modulating the carrier wave energy from said transmitter in accordance with the sound portion of the motion picture being shown. The radio transmitter is coupled by means of a power divider 216 of any well-known type to coaxial cables 225 and 225A. Cables are comprised of a center conductor 226, fed by power divider 216, and ground sheath 227 held at ground potential, serving to confine all signal energy within the coaxial cables 225 and 225A. The coaxial cables 225 and 225A connect with the input circuits of coupling means 231, 232, 233, 234, 235 and 236 as shown. The outputs of coupling means 231 through 236 feed r.f. energy to inductive-signaling conductors 210 (A–F). The inductive-signaling conductors comprise center conductor 12A, ground sheath 12 and radiating element 24 as shown in more detail in FIGS. 9 and 12. The inductive-signaling cables 12A, 12 and 24 as shown in ramp section 202A, of FIG. 16, also are comprised in ramp sections 202B through 202F. As shown in ramp section 202A, the center conductor 12A is connected with inductive-signaling element 24 at the far end 222 of each length of cable, and is connected to ground at coupling means 231. The ground connection is as shown at 223 and 224 of FIG. 15. As described in connection with FIG. 14, an inductive-signaling cable 230 is formed around the periphery of the drive-in theater to prevent unauthorized listening to the motion picture sound on streets outside of the theater area. Cable 230 is fed by a security radio transmitter 217 as earlier described in connection with the description of FIG. 14. The far end of the security cable is connected through load resistor 218 to ground 219. As described in connection with FIG. 14, white noise or other sound at the same radio frequency as employed by the cable system within the drive-in theater is used to modulate radio transmitter 217. The purpose of resistor 218, FIGS. 14 and 16, is to match the impedance between resistor and cable, thereby minimizing radiation beyond the limits specified in the Government's rules relating to restricted range radio devices. Likewise, resistor 223 in FIG. 15 serves the same purpose of impedance matching and minimizing radiation beyond the Government's limits relating to restricted range devices.

The term coaxial cable as used herein may refer to the central shielded portion 12 and 12A of the combination cable such as is found in FIG. 12 as well as a separate coaxial cable.

While the cable structures such as shown in FIGS. 5, 6, 7, 8, 9, 11 and 12 represent presently-preferred cable embodiments, it is understood that other forms of radiating coaxial cables may be utilized in providing localized radio signals for the purpose of reaching radio-equipped cars within drive-in theaters.

While the foregoing specification is descriptive of certain embodiments of the system of the present invention incorporating in a single integrated system a number of motion picture drive-in theater applications, the scope of the invention is not in any sense restricted to the illustrative embodiments as shown, and other embodiments evident to those skilled in the art are considered to be within the scope of the present invention, said scope to be determined from the following claims.

We claim:

1. A communication system of the inductive-signaling type for use in drive-in motion picture theaters and the like having rows of designated parking spaces therein comprising a carrier wave generator which generates a carrier wave within the designated broadcast band which can be received by conventional automobile radios, means for modulating the carrier wave energy from said generator, means coupling the output of said generator to the center conductor of a coaxial cable having a conducting sheath around said center conductor which conducting sheath is held at the same ground potential as said carrier wave generator, at least one inductive-signaling conductor extending across more than one of said designated parking spaces along one of said rows of designated parking space, said inductive-signaling conductor having a coupling means connecting one end of said inductive-signaling conductor to said center conductor whereby a controlled amount of carrier wave energy may be transferred from said center conductor to said inductive-signaling conductor which inductively transmits said modulated carrier wave energy for receipt by the conventional automobile radios of automobiles parked in said designated parking spaces and terminating means connecting the other end of said inductive-signaling conductor to the conductive sheath of said coaxial cable.

2. The system of claim 1 where there is a plurality of inductive-signaling conductors, each one positioned along at least part of one row of said parking spaces.

3. The system of claim 2 where each row of designated parking spaces has a ramp for properly positioning an automobile in view of a motion picture screen within which ramps said inductive-signaling conductors are mounted.

4. The system of claim 3 wherein said ramps form concentric arcs in front of said screen and wherein the inductive-signaling conductors are connected together by said coaxial cable means which extends across said ramps to said carrier wave generator.

5. The system of claim 1 wherein said inductive-signaling conductor extends along and between more than one of said rows of designated parking spaces.

6. The system of claim 5 wherein each row of designated parking spaces has a ramp for properly positioning the automobiles parked thereon in relationship to a motion picture screen and within which ramps that portion of said inductive-signaling conductor, which extends along said rows of parking spaces, is mounted.

7. The system of claim 1 wherein said signaling conductor extends along at least a portion of said coaxial cable.

8. The system of claim 2 wherein said coaxial cable and said inductive-signaling conductor are for at least a part of their length combined in a unitary cable structure.

9. The system of claim 1 wherein along the outside of at least a portion of the theater area formed by the rows of designated parking spaces, is positioned a second inductive-signaling conductor which is operatively connected to a transmitter which generates a carrier wave at the same frequency as the signal imposed on the said first inductive-signaling conductor positioned along at least one of said rows of designated parking spaces and a means for modulating the carrier wave differently from that in said first inductive-signaling conductor whereby a signal is produced in said second inductive-signaling conductor that interfers with the reception of the signal produced by the first inductive-signaling conductor outside the theater area.

10. The system of claim 1 wherein a radio transmitter which generates a carrier wave at the same frequency as that imposed on said inductive-signaling conductor is operatively connected to means for modulating said carrier wave differently.

* * * * *